Oct. 28, 1941.  K. R. BIXBY  2,260,928
ELECTRIC WELDING APPARATUS
Filed June 3, 1940   5 Sheets-Sheet 1

Fig.1

INVENTOR
KENNETH R. BIXBY
BY
ATTORNEY

Fig.2

Oct. 28, 1941.    K. R. BIXBY    2,260,928
ELECTRIC WELDING APPARATUS
Filed June 3, 1940    5 Sheets-Sheet 3

INVENTOR
KENNETH R. BIXBY
BY
ATTORNEY

Oct. 28, 1941.   K. R. BIXBY   2,260,928
ELECTRIC WELDING APPARATUS
Filed June 3, 1940   5 Sheets-Sheet 4

INVENTOR
KENNETH R. BIXBY
BY
ATTORNEY

Oct. 28, 1941.  K. R. BIXBY  2,260,928

ELECTRIC WELDING APPARATUS

Filed June 3, 1940  5 Sheets-Sheet 5

INVENTOR
KENNETH R. BIXBY
BY
ATTORNEY

Patented Oct. 28, 1941

2,260,928

UNITED STATES PATENT OFFICE 2,260,928

ELECTRIC WELDING APPARATUS

Kenneth R. Bixby, Canton, Ill.

Application June 3, 1940, Serial No. 338,538

32 Claims. (Cl. 219—4)

This invention relates to an electric welding apparatus and is designed primarily for welding the rods of a screen to the supporting bars thereof. In one type of screen the screening element comprises a large number of laterally spaced rods of small diameter which extend lengthwise of the screen and are supported by a plurality of cross bars of relatively large diameter, each rod being welded to all the cross bars. The rods are spaced short distances one from the other, usually less than the diameter of the rods, and the spacing should be the same between all the rods and should be uniform throughout the length of the rods. Due to the length of the rods and the large number of welding operations which are necessary to attach all the rods to all the cross bars it is difficult to establish the proper spacing of the rods and to maintain the same during the welding operations. Further, it is important that the successive weldings should be so effected as to maintain the upper surfaces of the rods substantially in a common plane. As a result the welding operations require an excessively large amount of time and labor and it is difficult if not impossible to correct any error which may be made.

A screen of this type may consist of a single screening element or of a plurality of separately formed screening elements assembled on a single frame and the term "screen" is herein used to designate a screen element regardless of whether it constitutes the entire screen or a part only of a complete screen.

One object of the invention is to provide an apparatus by means of which the rods of a screen or the like may be quickly and easily welded to cross bars in accurately spaced relation one to the other.

A further object of the invention is to provide such an apparatus with which the welding fusion will be so controlled that the upper surfaces of the several rods will be substantially in the same plane.

A further object of the invention is to provide such an apparatus with which the cross bars and the rods may be moved as a unit with relation to the welding device to properly position the same for successive welding operations.

A further object of the invention is to provide such an apparatus having means for automatically shifting the screen unit from one welding position to the next welding position.

A further object of the invention is to provide such an apparatus having means for accurately positioning the rods and holding the same against relative movement during the shifting and welding operations.

Other objects of the invention may appear as the apparatus is described in detail.

In the accompanying drawings Fig. 2 is a front elevation of such an apparatus, partly broken away, and omitting the welding machine.

In these drawings I have illustrated one embodiment of my invention and have shown the same as designed primarily for welding rods and bars of a screen. It will be understood, however, that this particular embodiment has been chosen for the purpose of illustration only and that the apparatus may take various forms and may be used for various purposes.

In that embodiment of the invention here illustrated the apparatus comprises a welding machine which is here shown as comprising a main frame or housing 15, welding arms 16 and 17 arranged one above the other and carrying electrodes 18 and 19. The upper welding arm 16 is pivotally mounted on the main frame at 20 to permit the electrode 18 to be moved toward and from the electrode 19. The movable arm 16 may be actuated in any suitable manner, either manually or by power, and, as here shown, it is actuated by a foot lever 21 which is connected with an extension 22 of the upper arm 16 by means including a connecting rod 23. The machine is also provided with a cooling system 23a but this forms no part of the invention. The welding machine may, however, be of any suitable construction, it being only necessary that it should embody electrode supporting members so arranged that the screen may be inserted between the electrodes and that one of these supporting members should be movable toward and from the other, together with suitable means for actuating the movable electrode supporting member.

Figure 1:
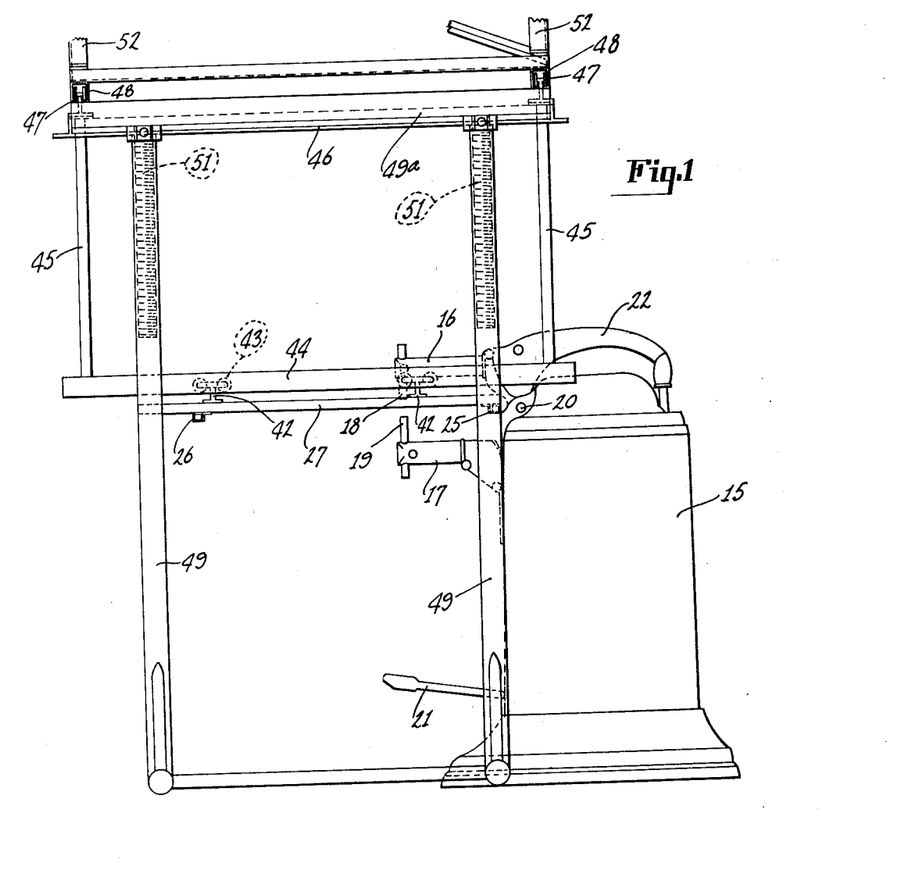
Fig. 1 is an end elevation of an apparatus embodying my invention, partly broken away.
Figure 3:
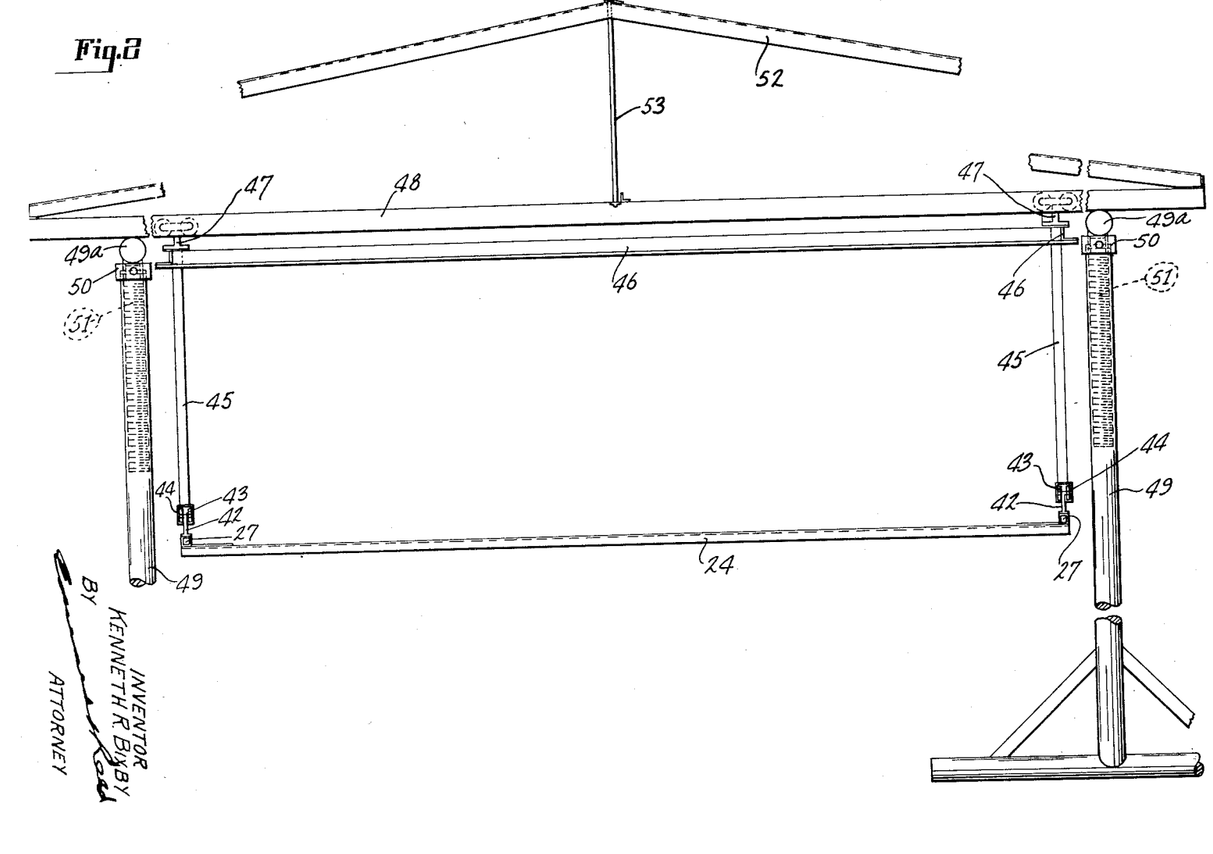
Fig. 3 is a plan view of the screen supporting carriage, with the screen partly broken away.
Figures 4, 5:
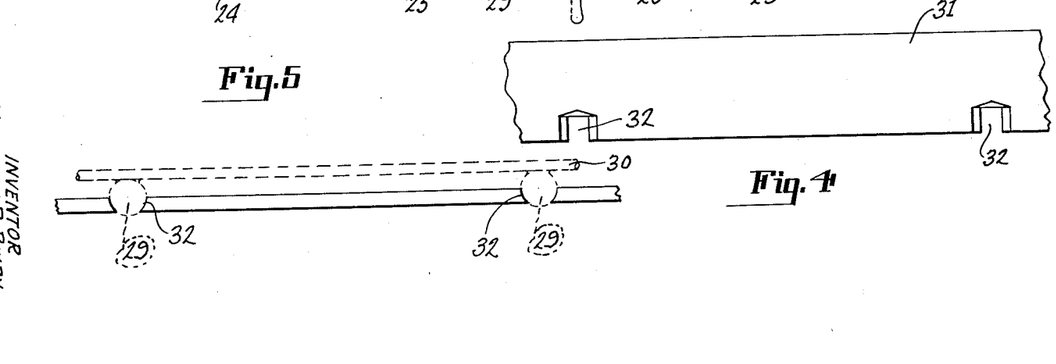
Fig. 4 is a plan view of a portion of one of the bar supporting elements of the carriage.
Fig. 5 is an edge view of the part shown in Fig. 4.
Figure 6:
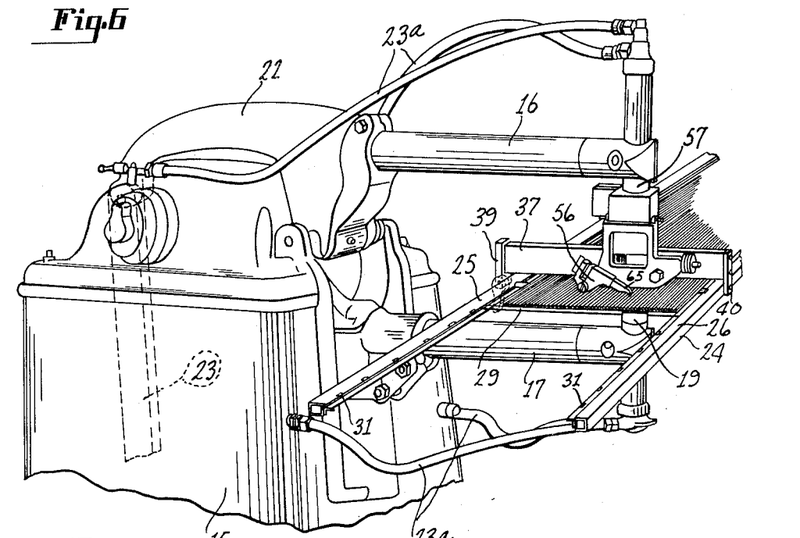
Fig. 6 is a perspective view of a portion of the apparatus showing the relation of the screen supporting carriage to the welding machine.
Figure 7:
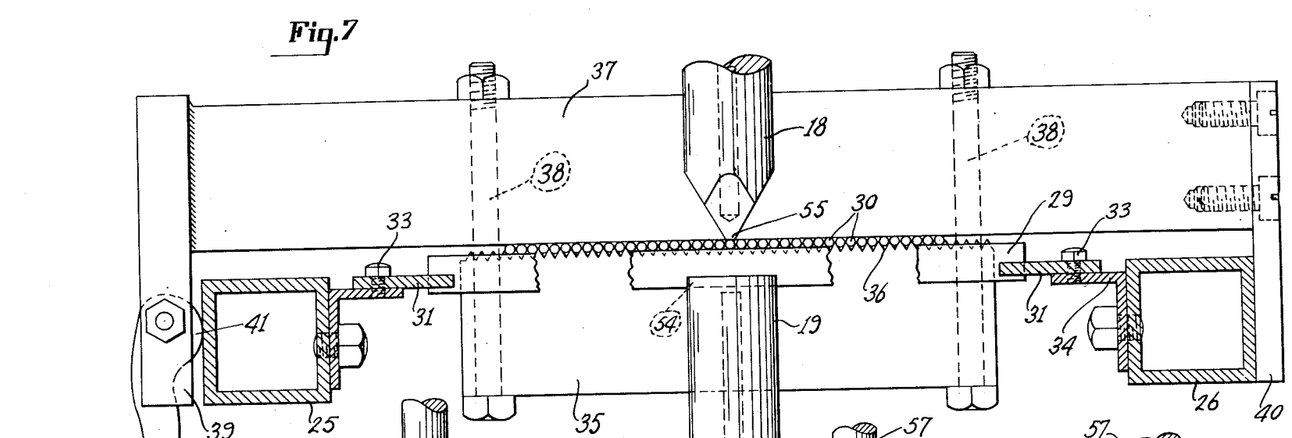
Fig. 7 is a transverse sectional view taken through the screen supporting carriage and partly broken away.
Figure 8:
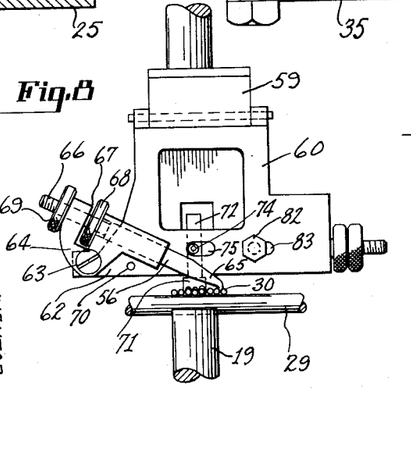
Fig. 8 is a front elevation of the feeding device.
Figures 9, 10:
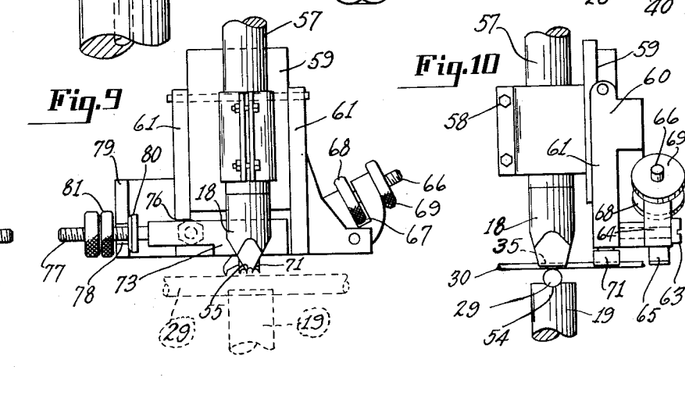
Fig. 9 is a rear elevation of the feeding device.
Fig. 10 is a side elevation of the feeding device.
Figures 11, 12, 13:
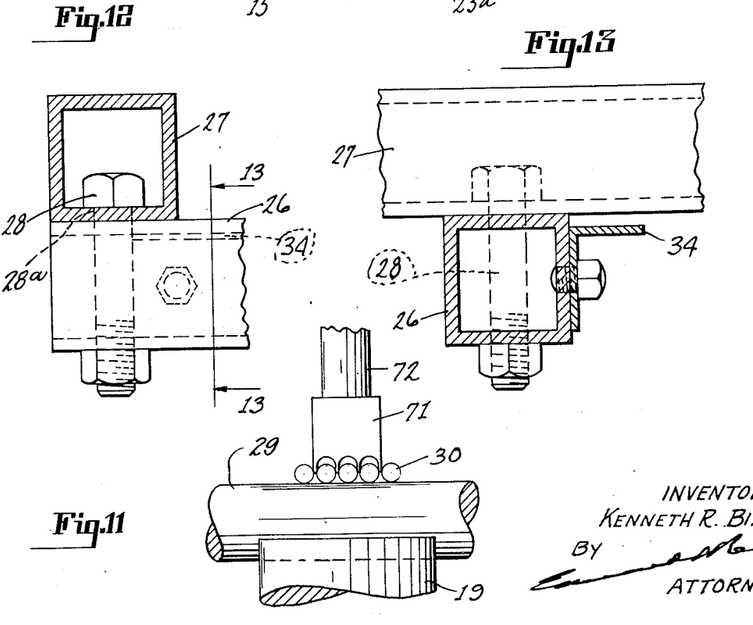
Fig. 11 is a detail view of the spacing head which forms a part of the feeding device.
Fig. 12 is a side elevation of a portion of the carriage showing the adjusting means.
Fig. 13 is a section on the line 13—13 of Fig. 12.

The means for supporting the screen between the electrodes may take any suitable form but preferably it comprises a carriage 24 having means for supporting the screen thereon and mounted for movement both lengthwise of and transversely to the screen to successively position the intersecting parts of the rods and bars between the electrodes. As shown more particularly in Fig. 3, the carriage is rectangular in form and comprises side members 25 and 26 connected at their ends by transverse end members 27. Preferably one of the side members is adjustable toward and from the other to permit the carriage to be accommodated to screens of different widths. In the present instance the side member 26 is connected with the end members 27 by suitable clamping devices 28 which extend through slots 28a in the lower walls of the end members, both the end members and the side members being preferably tubular in form and rectangular in cross section. The side members 25 and 26 of the screen are provided with means to support the cross bars 29 of the screen in fixed positions thereon, these bars being spaced apart lengthwise of the carriage and forming a support for the screen rods 30. In the arrangement shown each side member is provided with a bar supporting member or plate 31 which is provided with recesses or sockets 32 to receive the adjacent ends of the bars 29. When, as in the present instance, the bars 29 are round in cross section these sockets may conveniently take the shape of short slots formed in the inner edges of the supporting members 31 and having their side walls converging downwardly, as shown in Figs. 4 and 5, so as to form seats in which the ends of the bars may rest, and in which they will be firmly held. The side members of the carriage are so adjusted with relation one to the other that the ends of the bars will be close to or in contact with the inner ends of the sockets, so as to prevent any substantial lengthwise movement of the bars. To accommodate the carriage to screens in which the cross bars are of different sizes or shapes or differently spaced a plurality of bar supporting members 31 are preferably provided, and may be interchangeably mounted on the side members of the carriage. As here shown, each of the bar supporting members 31 is attached, by screws 33, to an angle bar 34 secured to the inner side of the side member of the carriage, as shown in Fig. 7.

When the cross bars have been seated in the frame the rods 30 are placed thereon and are temporarily secured in their properly spaced relation one to the other. Any suitable means may be provided for so securing the rods but in the arrangement illustrated I employ a clamping device which comprises a clamping bar 35 arranged beneath the rods and between the bar supporting members 31 and having in its upper edge a plurality of tapered recesses 36 of such a character and so arranged as to properly space the rods when the latter are seated therein. A second clamping bar 37 extends across the carriage above the rods and has a straight lower edge to engage the rods and retain them in their respective recesses, this upper bar being connected with the lower bar 35 by bolts 38 or other suitable means for drawing the two bars together and clamping the rods between the same. The upper clamping bar 37 extends across the side members of the carriage and is preferably provided with means for securing the same thereto, this means being here shown as downwardly extending parts or arms 39 and 40 which extend downwardly across the side members 25 and 26 and the arm 39 is provided with means, such as a cam 41, adapted to engage the adjacent side member 25 and draw the other arm 40 into firm contact with its side member 26, thus securing the clamping device to the carriage and permitting it to be readily adjusted lengthwise of the latter.

The carriage is of such a character that it and the screen supported thereby may be inserted between the electrode supporting arms 16 and 17 and may be moved either longitudinally or transversely with relation to the electrodes. Preferably the carriage is suspended from an overhead structure and it is here shown as provided at each end with hangers 42 attached thereto at 42a and provided with rollers 43 adapted to have supporting engagement with tracks 44 arranged above and extending transversely to the carriage and of such length that the rollers may move thereon distances sufficient to permit the screen to be moved to the desired positions with relation to the electrodes. Each track 44 has secured thereto upwardly extending rods 45 which are connected one to the other adjacent their upper ends by bars 46 and each of which is provided at its upper end with a roller carriage 47, the rollers of which engage tracks 48 extending lengthwise of the carriage and of a length substantially greater than the length of the carriage so that the latter may be moved lengthwise to bring the cross bars successively between the electrodes. The tracks 48 are here shown as supported on standards 49 which are preferably adjustable in height to permit the tracks 48 to be supported at different elevations and, as here shown, each standard has at its upper end a rotatable nut 50 through which extends a screw threaded rod 51 having its upper end secured to one of the tracks 48. The standards are connected with the tracks 48 near the respective ends thereof and the tracks may be reinforced by a suitable truss-like structure 52 connected with the intermediate portions of the tracks by tie rods 53. The tracks and hangers may be of any suitable character and, as here shown, correspond substantially to the ordinary barn door tracks and hangers.

When the screen rods and bars have been assembled on the carriage 24 in the manner described the carriage is adjusted to bring one of the cross bars 29 into a position above and in engagement with the lower electrode 19, this electrode being preferably provided in its upper end with a groove 54 extending lengthwise of the bar and adapted to receive the bar and support the same in proper position with relation to the electrode and to permit the bar to move lengthwise with relation to the electrode (see Figs. 7 to 10). The carriage is then adjusted laterally to bring one of the rods into position beneath the upper electrode 18 which is preferably provided in its contact end with a groove 55 to receive the rod which is to be welded and properly position the same with relation to the electrode and the cross bar and retain the same in that position during the welding operation. Preferably the carriage is moved inwardly toward the welding machine so that the outermost rod is first brought into welding position. The machine is then operated in the usual manner to effect the welding operation and the carriage is moved outwardly step by step to bring all the rods successively into welding position, the cross bar remaining in engagement with the lower electrode during this adjustment. Means are provided for automatically imparting this step by step movement to the screen and carriage under the control of the movable electrode supporting arm. Associated with this feeding means are other means to engage the rod which is about to be welded to properly position the same with relation to the adjacent rods prior to its engagement by the upper electrode.

The automatic feeding device may take various forms and may be operated in any suitable manner under the control of the movable electrode supporting member or arm 16. Preferably it is in the form of a pawl 56 supported by the upper arm 16 and so arranged that upon each complete operation of that arm the pawl will engage one of the rods and move the screen and carriage laterally a distance sufficient to bring an unwelded rod to welding position between the electrodes. The clamping bars 35 and 37 are preferably spaced a short distance to the rear of the electrodes, that is, they are arranged between the cross bar which is to be welded and the next unwelded cross bar. The feeding device is preferably arranged on that side of the electrode opposite the clamping device. In the particular type of welding machine here shown the upper welding arm 16 is provided with a rod or shank 57 which extends below the outer or free end of the arm and in the lower end of which the electrode 18 is mounted, and I have utilized this shank as a convenient means for connecting the feeding device with the movable welding arm. In the construction illustrated a split sleeve 58 is clamped about the shank 57 and has rigidly secured thereto, in front of the shank, a plate 59. Pivotally mounted on this plate, on an axis transverse to the shank 57 is a supporting structure or frame 60 which is provided at its lateral edges with rearwardly extending flanges 61 arranged to have snug contact with the lateral edges of the plate 59, when the frame 60 is in its lowermost or operative position, and thus firmly hold the frame against lateral displacement with relation to the electrode 18. At its lower end the frame 60 is provided with a lateral extension 62 on which the feeding member or pawl 56 is pivotally mounted at 63. The pawl comprises two parts, a pivoted body portion 64 and a nose portion 65 which is longitudinally adjustable in the body portion and comprises a screw threaded shank 66 extending through the body portion. The body portion is slotted at 67 to receive an adjusting nut 68 which is threaded onto the shank 66, and a second nut 69 mounted on the shank 66 beyond the body portion serves to lock the shank in its adjusted position. In this manner the effective length of the pawl 56 may be varied to accommodate the same to rods of different sizes and of different spacing. Upon the upward movement of the upper welding arm the pawl moves therewith and out of engagement with the screen rods and at the same time the nose portion 65 moves downwardly about the axis of the pawl, this downward movement being limited by a stop 70, so that upon the downward movement of the welding arm the nose of the pawl will engage one of the rods and move that rod and the screen as a whole a distance sufficient to bring the next unwelded rod into welding position. Preferably the pawl extends beyond the welding point so that it will act on previously welded rods, thus avoiding any flexing of the engaged rod which might result if the rod so engaged was held only by the clamping device and the latter was spaced a substantial distance from the pawl.

In order to insure the adquate spacing of each rod with relation to the adjacent rods I have mounted on the frame 60 a spacing device adapted to engage the rod which is about to be welded and at least one rod on each side of that rod and properly space the same as the electrode 18 approaches the rod to be welded but before it engages the same. This device is here shown as a head 71 having a plurality of grooves extending lengthwise of the rods 30 and so arranged that when the rods are seated in the respective grooves they will be properly spaced with relation one to the other. This rod is carried by the frame 60 so that it operates simultaneously with and in timed relation to the feeding device. However, it is necessary to provide different spacing heads for rods of different sizes, or differently spaced, and this requires that each head shall be differently positioned with relation to the supporting frame 60. I have therefore provided each head with a shank 72 which is mounted in a block 73 carried by the frame 61 and is held in vertically adjusted positions with relation thereto by a set screw 74 which extends into a slot 75 in the frame 60. This block 73 is mounted on the rear side of the frame 60 between the lower portions of the flanges 61 and is adjustable lengthwise between those flanges to effect a lateral adjustment of the spacing head. As here shown, the block has a reduced portion which extends through a slot 76 in one of the flanges 61 and is provided with a screw threaded shank 77 which extends through an opening 78 in a flanged extension 79 at that side of the frame 60 opposite the pawl 56. Nuts 80 and 81 threaded onto the shank 77 on opposite sides of the flange 79 provide for a very fine adjustment of the block. The block is rigidly held in adjusted positions by means of a screw 82 extending through a slot 83 in the frame and threaded into the block. It will be noted that this block lies between the frame 60 and the electrode 18 and the frame is pivotally mounted to permit the same to be sprung outwardly and upwardly and thus enable access to be had to the spacing head and its supporting structure.

When all the rods have been welded to one of the cross bars the clamping bars 35—37 are loosened and shifted rearwardly to a position beyond the next unwelded cross bar and there again attached to the rods and carriage. The carriage is then moved forwardly to bring the next unwelded cross bar into welding position between the electrodes and the several rods are then successively welded to that cross bar in the manner above described. It will be apparent that the welding operations may be very quickly effected and that the rods will be welded to the cross bars in accurately spaced relation one to the other.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In an apparatus for welding a plurality of elements successively to a supporting member, a welding device comprising electrodes arranged to receive between them said supporting member and an element to be welded thereto, one of said electrodes being normally stationary and the other of said electrodes being movable toward and from the stationary electrode, a feeding device including a member movably supported above said stationary electrode, and means for operating said movable electrode and said feeding device in timed relation to effect the welding operation and to cause said movable feeding member to engage a previously welded element and move said supporting member and said elements lengthwise of said supporting member to bring an unwelded element into welding position between said electrodes upon each complete operation of said movable electrode.

2. In an apparatus for welding a plurality of elements successively to a supporting member, a welding device comprising electrodes arranged to receive between them said supporting member and an element to be welded thereto, one of said electrodes being normally stationary and the other of said electrodes being movable toward and from the stationary electrode, means for clamping said elements in predetermined positions with relation one to the other and to said supporting member, a feeding device including a member movably supported above said stationary electrode, and means for operating said movable electrode and said feeding device in timed relation to effect the welding operation and to cause said movable feeding member to engage one of said elements and move said supporting member and said elements lengthwise of said supporting member to bring an unwelded element into welding position between said electrodes upon each complete operation of said movable electrode.

3. In an apparatus for welding a plurality of elements successively to a supporting member, a welding device comprising electrodes arranged to receive between them said supporting member and an element to be welded, one of said electrodes being movable toward and from the other electrode, means for actuating said movable electrode and effecting the welding operation, and a feeding device including a member connected with said movable electrode for movement therewith and arranged to engage one of said elements upon each complete operation of said movable electrode and move said supporting member and said elements to position an unwelded element between said electrodes.

4. In an apparatus for welding a plurality of elements successively to a supporting member, a welding device having electrode supporting arms, one of which is movable toward and from the other, electrodes carried by said arms, and a feeding device comprising a part connected with said movable arm for movement therewith, and an actuating member movably mounted on said part of said feeding device and so arranged that a complete movement of said movable supporting member from and toward the other supporting member will cause said actuating member to engage a previously welded element and move said supporting member longitudinally to bring an unwelded element into welding position with relation to said electrodes.

5. In an apparatus for welding a plurality of elements successively to a supporting member, a welding device having electrode supporting arms, electrodes carried by said arms, one of said arms being pivotally mounted to move its electrode toward and from the electrode of the other arm, a connecting member connected to said pivoted arm near the free end thereof, and a pawl pivotally mounted on said connecting member and so arranged that the movement of said pivoted arm toward said other arm will cause said pawl to engage a previously welded element and move said supporting member longitudinally to bring an unwelded element to a welding position between said electrodes.

6. In an apparatus for welding a plurality of elements successively to a supporting member, a welding device having electrode supporting arms, one of which is movable toward and from the other, electrodes carried by said arms, and a feeding device comprising a part connected with said movable arm for movement therewith, an actuating member movably mounted on said part of said feeding device and so arranged that a complete movement of said movable supporting arm from and toward the other supporting arm will cause said actuating member to engage a previously welded element and move said supporting member longitudinally to bring an unwelded element into welding position with relation to said electrodes, and means actuated by said movable arm to accurately position said unwelded element with relation to an adjacent welded element prior to the welding operation.

7. In an apparatus for welding a plurality of elements successively to a supporting member, a welding device having electrode supporting arms, electrodes carried by said arms, one of said arms being pivotally mounted to move its electrode toward and from the electrode of the other arm, a connecting member connected to said pivoted arm near the free end thereof, a pawl pivotally mounted on said connecting member and so arranged that the movement of said pivoted arm toward said other arm will cause said pawl to engage a previously welded element and move said supporting member longitudinally to bring an unwelded element to a welding position between said electrodes, and a device carried by said connecting member to accurately space said unwelded element with relation to an adjacent welded element after it has been moved by the action of said pawl.

8. In an apparatus for welding a plurality of elements successively to a supporting member, a welding device having electrode supporting arms, one of which is movable toward and from the other, electrodes carried by said arms, means for establishing a preliminary connection between said elements and said supporting member, a feeding device comprising a part connected with said movable arm for movement therewith, and an actuating member movably mounted on said part of said feeding device and so arranged that upon each complete operation of said movable arm said actuating member will engage a previously welded element and move said supporting member longitudinally to bring an unwelded element into welding position with relation to said electrodes.

9. In an apparatus for welding a plurality of rods to cross bars, a pair of welding electrodes adapted to engage respectively a bar and an intersecting rod adjacent the point of welding, one of said electrodes being movable toward and from the other electrode, a structure having means to support said bars in fixed relative positions with said rods superposed on said bars and being movable with relation to said electrodes to move said bars and rods between said electrodes to bring the intersecting parts thereof successively into welding position, means for actuating said movable electrode and effecting the welding operation, and a device connected with said movable electrode and having a part to engage one of said rods upon each complete operation of said electrode and move all of said bars and said rods to bring an unwelded rod into welding position.

10. In an apparatus for welding a plurality of rods to cross bars, a pair of welding electrodes adapted to engage respectively a bar and an intersecting rod adjacent the point of welding, one of said electrodes being movable toward and from the other electrode, a structure having means to support said bars in fixed relative positions with said rods superposed on said bars and being movable with relation to said electrodes to move said bars and said rods between said electrodes to bring the intersecting parts thereof successively into welding position, means for actuating said movable electrode and effecting the welding operation, an operable member to engage a rod which has been welded to the bar which is between said electrodes and impart unitary movement to said bars and said rods to move an unwelded rod into welding position, and means operating in timed relation to said movable electrode to operate said operable member upon each complete operation of said movable electrode.

11. In an apparatus for welding a plurality of rods to a cross bar, a pair of welding electrodes adapted to engage respectively a bar and an intersecting rod adjacent the point of welding, one of said electrodes being movable toward and from the other electrode, means for supporting said bars and said rods for movement between said electrodes to bring the intersecting parts thereof successively into welding position with relation to said electrodes, means for actuating said movable electrode and effecting the welding operation, a feeding device for imparting movement to said cross bar and said rods to bring an unwelded rod into welding position, a device for accurately positioning said unwelded rod, and means operating in timed relation to said movable electrode to actuate said feeding device after each welding operation and to cause said positioning device to engage said unwelded rod after the latter has been moved by said feeding device and before said rod has been engaged by said electrode.

12. In an apparatus for welding a plurality of rods to a cross bar, a pair of welding electrodes adapted to engage respectively a bar and an intersecting rod adjacent the point of welding, one of said electrodes being movable toward and from the other electrode, means for supporting said bars and said rods for movement between said electrodes to bring the intersecting parts thereof successively into welding position with relation to said electrodes, means for actuating said movable electrode and effecting the welding operation, a feeding device for imparting movement to said cross bar and said rods to bring an unwelded rod into welding position, a device having parts to simultaneously engage a welded rod and said unwelded rod to accurately position the latter, and means operating in timed relation to said movable electrode to actuate said feeding device after each welding operation and to cause said positioning device to engage said rods after said unwelded rod has been moved by said feeding device and before it has been engaged by said movable electrode to accurately position said unwelded rod with relation to said welded rod and to said electrodes.

13. In an apparatus for welding a plurality of rods to cross bars, a pair of welding electrodes adapted to engage respectively a bar and an intersecting rod adjacent the point of welding, one of said electrodes being movable toward and from the other electrode, means for supporting said bars and said rods for movement as a unit with one of said bars arranged between said electrodes for longitudinal movement with relation thereto, means for actuating said movable electrode and effecting the welding operation, an operable member to engage a rod which has been welded to the bar which is between said electrodes and impart said unitary movement to said bars and rods to move an unwelded rod into welding position between said electrodes, a device acting on said unwelded rod to accurately position the same with relation to an adjacent rod, and means controlled in accordance with the movement of said movable electrode to operate said operable member and said positioning device.

14. In an apparatus for welding a plurality of rods to cross bars, a pair of welding electrodes adapted to engage respectively a bar and an intersecting rod adjacent the point of welding, one of said electrodes being movable toward and from the other electrode, means for supporting said bars and said rods, said supporting means being movable lengthwise of said rods to position a selected bar between said electrodes and transversely to said rods to position said rods successively between said electrodes, means for actuating said movable electrode and effecting the welding operation, and means controlled by said actuating means and operating in timed relation to the movement of said movable electrode to impart movement to said bars and said rods in the last mentioned direction after each welding operation.

15. In an apparatus for welding a plurality of rods to cross bars, a pair of welding electrodes adapted to engage respectively a bar and an intersecting rod adjacent the point of welding, one of said electrodes being movable toward and from the other electrode, means for supporting said bars and said rods for movement as a unit lengthwise of said rods to position a selected bar between said electrodes and transversely to said rods to position said rods successively between said electrodes, means for actuating said movable electrode and effecting the welding operation, an actuating device connected with said movable electrode for movement therewith and including a pivotally supported part arranged to engage one of said rods upon each complete movement of said movable electrode toward and from the other electrode and move said rod and said bars step by step in the last mentioned direction.

16. In an apparatus for welding a plurality of rods to a cross bar, a welding device comprising a pair of electrode supporting members one of which is movable toward and from the other, an electrode carried by each supporting member, means separate from said electrodes for supporting said bar and said rods for movement between and with relation to said electrodes, means for actuating said movable supporting member and effecting the welding operation, and a device connected with said movable supporting member for bodily movement therewith and comprising a part arranged to engage one of said rods upon each movement of said movable supporting member in one direction and impart movement to said bar and said rods to move an unwelded intersecting portion thereof into welding position between said electrodes.

17. In an apparatus for welding rods to cross bars, a welding device comprising a pair of electrode supporting members one of which is movable toward and from the other, an electrode carried by each supporting member, a carriage having means for supporting a plurality of cross bars in fixed relative positions with a plurality of rods superposed on said bars, means for supporting said carriage for movement lengthwise of said rods to position a selected bar between said electrodes and for movement transverse to said rods to position said rods successively between said electrodes, means for actuating said movable supporting member and effecting the welding operation, and means actuated by said movable supporting member upon a complete operation thereof to impart a predetermined transverse movement to said carriage.

18. In an apparatus for welding rods to cross bars, a welding device comprising a pair of electrode supporting members one of which is movable toward and from the other, an electrode carried by each supporting member, a carriage having means for supporting a plurality of cross bars in fixed relative positions with a plurality of rods superposed on said bars, means for supporting said carriage for movement lengthwise of said rods to position a selected bar between said electrodes and for movement transversely to said rods to position said rods successively between said electrodes, means for actuating said movable supporting member and effecting the welding operation, and an actuating member pivotally supported on said movable supporting member and actuated thereby to impart a predetermined transverse movement to said carriage between successive welding operations.

19. In an apparatus for welding rods to cross bars, a welding device comprising a pair of electrode supporting members one of which is movable toward and from the other, an electrode carried by each supporting member, a carriage having means for supporting a plurality of cross bars in fixed relative positions with a plurality of rods superposed on said bars, means for supporting said carriage for movement lengthwise of said rods to position a selected bar between said electrodes and for movement transversely to said rods to position said rods successively between said electrodes, means on said carriage for maintaining said rods in spaced relation one to the other, means for actuating said movable supporting member and effecting the welding operation, and an actuating member pivotally supported on said movable supporting member and arranged to engage a previously welded rod and impart a predetermined transverse movement to said rod and said carriage upon each complete operation of said movable supporting member.

20. In an apparatus for welding rods to cross bars, a welding device comprising a pair of electrode supporting members one of which is movable toward and from the other, an electrode carried by each supporting member, a carriage having means for supporting a plurality of cross bars in fixed relative positions with a plurality of rods superposed on said bars, means for supporting said carriage for movement lengthwise of said rods to position a selected bar between said electrodes and for movement transversely to the said rods to position said rods successively between said electrodes, means for actuating said movable supporting member and effecting the welding operation, clamping members supported on said carriage and extending across said rods, one of said clamping members having a longitudinal series of recesses to receive the respective rods and retain the same in spaced relation one to the other, and an actuating device connected with said movable supporting member and having a part arranged to engage a part of said rods and impart a predetermined movement to said carriage upon each complete operation of said movable supporting member.

21. In an apparatus for welding a plurality of rods to a cross bar, a welding device comprising a pair of electrode supporting members, one of which is movable toward and from the other, an electrode carried by each supporting member, means separate from said electrodes for supporting said bar and said rods for movement between and with relation to both electrodes, means for actuating said movable supporting member and effecting the welding operation, a device carried by and movable with said movable supporting member and having means to move an unwelded rod to substantially welding position upon each movement of the movable electrode toward the other electrode, and a rod positioning device carried by said movable supporting member and so arranged with relation thereto that upon each movement of the movable electrode toward the other electrode it will engage and accurately position said unwelded rod before the latter is engaged by said movable electrode.

22. In an apparatus for welding a plurality of rods to a cross bar, a welding device comprising a pair of electrode supporting members, one of which is movable toward and from the other, an electrode carried by each supporting member, means separate from said electrodes for supporting said bar and said rods for movement between and with relation to both electrodes, means for actuating said movable supporting member and effecting the welding operation, a device carried by and movable with said movable supporting member and having means to move an unwelded rod to substantially welding position upon each movement of the movable electrode toward the other electrode, and a rod positioning device carried by and movable with said movable supporting member and having parallel grooves arranged respectively to embrace a welded rod and said unwelded rod as said movable electrode approaches the other electrode and accurately position said unwelded rod before it is engaged by said movable electrode.

23. In an apparatus for welding a plurality of rods to a cross bar, a welding device comprising a pair of electrode supporting members, one of which is movable toward and from the other, an electrode carried by each supporting member, means separate from said electrodes for supporting said bar and said rods for movement between and with relation to both electrodes, means for actuating said movable supporting member and effecting the welding operation, a device carried by and movable with said movable supporting member and having means to move an unwelded rod to substantially welding position upon each movement of the movable electrode toward the other electrode, a rod positioning device carried by and movable with said movable supporting member and having parallel grooves arranged respectively to embrace a welded rod and said unwelded rod as said movable electrode approaches the other electrode and accurately position said unwelded rod before it is engaged by said movable electrode, and means for adjusting said positioning device with relation to said movable supporting member to accurately locate said grooves with relation to the contact surface of said electrode.

24. In an apparatus for welding rods to cross bars, a welding device comprising a pair of electrode supporting members, one of which is movable toward and from the other, an electrode carried by each supporting member, a movable carriage to support said bars and said rods for movement between said electrodes to bring intersecting parts thereof successively into welding position, means for actuating said movable supporting member and effecting the welding operation, and a device carried by said movable supporting member and including a part arranged to impart movement to said carriage upon each complete movement of said movable supporting member toward and from the other member, to bring an unwelded rod into welding position, and a part to position said unwelded rod with relation to an adjacent rod.

25. In an apparatus for welding rods to cross bars, a pair of electrode supporting members, one of which is movable toward and from the other member, electrodes carried by said members, a carriage to support said bars and said rods, tracks arranged on opposite sides of said electrodes and extending transversely to the rods on said carriage, hangers connected with said carriage near the ends thereof and having supporting engagement with the respective tracks, said carriage having means for supporting said bars in fixed positions thereon, means for actuating said movable electrode supporting member and effecting the welding operation, and means connected with said movable supporting member and operable upon each complete operation thereof to impart transverse movement to said carriage and thereby move an unwelded rod between said electrodes.

26. In an apparatus for welding rods to cross bars, a pair of electrode supporting members, one of which is movable toward and from the other member, electrodes carried by said members, a carriage to support said bars and said rod, tracks arranged on opposite sides of said electrodes and extending transversely to the rods on said carriage, hangers connected with said carriage near the ends thereof and having supporting engagement with the respective tracks, other tracks supported above the first mentioned tracks and extending lengthwise of the rods on said carriage, hangers connected with the first mentioned tracks and having supporting engagement with the last mentioned tracks, means for actuating said movable electrode supporting member and effecting the welding operation, and means actuated by said movable supporting member to impart transverse movement to said carriage and thereby position an unwelded rod between said electrodes.

27. In an apparatus for welding rods to cross bars, a pair of electrode supporting members, one of which is movable toward and from the other member, electrodes carried by said members, a carriage to support said bars and said rods, tracks arranged on opposite sides of said electrodes and extending transversely to the rods on said carriage, hangers connected with said carriage near the ends thereof and having supporting engagement with the respective tracks, other tracks supported above the first mentioned tracks and extending lengthwise of the rods on said carriage, hangers connected with the first mentioned tracks and having supporting engagement with the last mentioned tracks, vertically adjustable standards having supporting connection with the last mentioned tracks near the ends thereof, means for actuating said movable electrode supporting member and effecting the welding operation, and a device carried by said movable supporting member and having a part arranged to engage a previously welded rod on each complete operation of said movable supporting arm and move said rod and said carriage to position an unwelded rod between said electrodes.

28. In an apparatus for welding rods to cross bars, a welding device comprising a pair of electrode supporting members, one of which is movable toward and from the other, an electrode carried by each supporting member, means for supporting said bars and said rods for movement between and with relation to said electrodes, means for actuating said movable supporting member and effecting the welding operation, a structure carried by said movable supporting member, a pawl pivotally mounted on said structure at one side of said electrodes and arranged to engage one of said rods and impart movement to said rods and said bars upon each complete operation of said movable supporting member, said pawl comprising a pivoted part, and a rod engaging part adjustable longitudinally with relation to said pivotal part, and means for rigidly securing said rod engaging part to said pivoted part in an adjusted position.

29. In an apparatus for welding rods to cross bars, a welding device comprising a pair of electrode supporting members, one of which is movable toward and from the other, an electrode carried by each supporting member, means for supporting said bars and said rods for movement between and with relation to said electrodes, means for actuating said movable supporting member and effecting the welding operation, a structure carried by said movable supporting member, a part pivotally mounted on said structure at one side of said electrodes and arranged to engage one of said rods and impart movement to said rods and said bars upon each complete operation of said movable supporting member, a rod positioning device mounted on said structure for adjustment transversely to said rods and arranged to engage the rod to be welded prior to its engagement by the movable electrode, and means for adjusting said positioning device and securing the same to said structure in adjusted positions.

30. In an apparatus for welding rods to cross bars, a welding device comprising a pair of electrode supporting members, one of which is movable toward and from the other, an electrode carried by each supporting member, means for supporting said bars and said rods for movement between and with relation to said electrodes, means for actuating said movable supporting member and effecting the welding operation, a structure carried by said movable supporting member, a pawl pivotally mounted on said structure for movement about an axis transverse to said electrodes and spaced from the welding point, and arranged to engage one of said rods and impart movement to said rods and said bars upon each operative movement of said movable supporting member toward the other supporting member, a member mounted on said structure adjacent the electrode carried by said movable supporting member, means for adjusting the last mentioned member transversely to said rods, and a rod positioning device mounted on said last mentioned member for adjustment therewith and for vertical adjustment with relation thereto to cause the same to engage the rod to be welded prior to its engagement by the movable electrode.

31. In an apparatus for welding rods to a cross bar, a lower electrode, an upper electrode movable toward and from said lower electrode, means for supporting said bar and rods for movement between and with relation to said electrodes, means for actuating said upper electrode and effecting the welding operation, and a device connected with said upper electrode for downward movement therewith and having a part so arranged that upon the downward movement of said upper electrode it will engage a previously welded rod and move said bar and said rods to bring an unwelded rod into welding position.

32. In an apparatus for welding rods to a cross bar, a lower electrode, an upper electrode movable toward and from said lower electrode, means for supporting said bar and rods for movement between and with relation to said electrodes, means for actuating said upper electrode and effecting the welding operation, a feeding device having means for moving said rods and said bar to move an unwelded rod substantially to welding position, a positioning device having means to engage said unwelded rod and accurately position the same with relation to said electrodes and to the adjacent welded rod, and means for connecting said feeding device and said positioning device with said upper electrode for operation thereby upon each downward movement of said upper electrode, said positioning device being arranged to engage said unwelded rod after the latter has been moved by said feeding device.

KENNETH R. BIXBY.